Jan. 14, 1964  S. DAWS ETAL  3,118,099
MULTI-POLE POLYPHASE INDUCTION MOTORS
Filed Sept. 6, 1960

INVENTORS
SAILAJANANDA DAWS
GEORGE A. BATTERSBY

ATTORNEY

United States Patent Office 3,118,099
Patented Jan. 14, 1964

3,118,099
MULTI-POLE POLYPHASE INDUCTION MOTORS
Sailajananda Daws, Shillong, Assam, India, and George Arthur Battersby, Hale, England, assignors to Associated Electrical Industries Limited, London, England, a British company
Filed Sept. 6, 1960, Ser. No. 54,106
Claims priority, application Great Britain Sept. 7, 1959
1 Claim. (Cl. 318—224)

This invention relates to polyphase induction motors and aims at providing an improved winding and terminal arrangement which makes it possible to provide a motor with a single distributed winding for operation at a speed which is lower than the speed determined by the fundamental pole number of the motor field and the fundamental frequency of the supply source to which the motor is connected.

Another object of the invention is to provide such a motor which can be operated at alternative speeds.

Yet another object is to provide such a multiple speed motor which can be operated at speeds related to each other as 5:2.

The theoretical basis of the invention is as follows:

As is well known the M.M.F. wave produced in the stator-rotor gap of a dynamo-electric machine, by passing a current of constant magnitude in a coil of the machine having a coil-span of $p\pi$ radians, where $p$ is a fractional pitch, can be regarded as a space wave comprising a Fourier series of sinusoidal wave components, viz., $$m_1 = K_{p1}A_1 \cos x + K_{p2}A_2 \cos 2x + \ldots + K_{pk}A_k \cos kx + \ldots$$

where:

$m_1$ is the resultant M.M.F. wave produced by exciting the coil,
$x$ is the angular distance measured from the centre line of the coil,
$A_k$ is the amplitude of the $k^{th}$ harmonic content,
$K_{pk}$ is the usual coil-span factor.

If, now, a second coil identical with the first coil and carrying the same current in series is placed with its own centre line displaced by $\alpha$ radians from the centre line of the first coil, then the M.M.F. wave of the second coil can be regarded as $$m_2 = K_{p1}A_1 \cos(x-\alpha) + K_{p2}A_2 \cos 2(x-\alpha) + \ldots + K_{pk}A_k \cos k(x-\alpha) + \ldots$$

The values of the resulting M.M.F. produced by the super-imposition of the two waves $m_1$ and $m_2$ will be given by $$m_\pm = m_1 \pm m_2$$

the nature of the signs depending on the relative sense of the currents in the two coils.

For co-phasal currents, $$m_+ = m_1 + m_2$$
$$= 2K_{p1}A_1 \cos \frac{\alpha}{2} \cos\left(x-\frac{\alpha}{2}\right)$$
$$+ 2K_{p2}A_2 \cos 2\frac{\alpha}{2} \cos 2\left(x-\frac{\alpha}{2}\right) + \ldots$$
$$+ 2K_{pk}A_k \cos k\frac{\alpha}{2} \cos k\left(x-\frac{\alpha}{2}\right) + \ldots$$

For anti-phasal currents, $$m_- = m_1 - m_2$$
$$= 2K_{p1}A_1 \sin \frac{\alpha}{2} \sin\left(x-\frac{\alpha}{2}\right) + 2K_{p2}A_2 \sin 2\frac{\alpha}{2} \sin 2\left(x-\frac{\alpha}{2}\right)$$
$$+ \ldots + 2K_{pk}A_k \sin k\frac{\alpha}{2} \sin k\left(x-\frac{\alpha}{2}\right) + \ldots$$

In a 3-phase arrangement where three symmetrical phase windings have a mutual spacing of 120° for the fundamental pole-number, the third order harmonics of the resultant field and their multiples cannot exist, as is known.

The occurrence of $m_+$ and $m_-$ M.M.F. waves is utilised in accordance with the present invention. It will be understood that by co-operation of coils carrying co-phasal and anti-phasal currents, a desired harmonic content of the M.M.F. wave can be accentuated, while sufficiently suppressing the other harmonics. In general, if the electrical spacing between the two sets of coils in each phase, carrying currents in the same sense is 180°, then the even order harmonics only can exist. Similarly, if it is so arranged that the electrical spacing between the co-phasal and anti-phasal sets of coils is 180°, then the odd order harmonics only can exist.

If a group of coils is wound in a positive direction for fundamental two pole operation, fifth harmonic operation can be obtained by splitting the group into three parts and connecting the sub-groups in the pattern +, —, +, in order to suppress the fundamental wave, and amplify the fifth harmonic. The centre sub-group which is negative should contain a number of turns equalling approximately the sum of the outer two sub-groups which are positive. This can be done by increasing the number of conductors in each slot or increasing the number of slots so that the number of effective conductors are related as +1—2+1.

From a general aspect the present invention resides in an induction motor having a distributed polyphase stator winding sub-divided to form portions spanning correlated arcs along the stator-rotor gap, the said portions being traversed by polyphase and anti-phase currents and interconnected to accentuate a selected harmonic component of the fundamental M.M.F. of the winding.

Where running at alternative speeds is desired external terminals can be provided to allow by suitable change of connections operation of the motor in accordance with alternative harmonics of the fundamental field.

More details will become apparent and the invention will be better understood from the following description referring to the accompanying drawings.

Arrangements for alternative high speed and low speed running will be described with reference to the accompanying drawings but it will be understood that where only one speed operation is required external terminals for the change of connections can be omitted, to simplify the machine, without departing from the essential feature of the invention, namely to accentuate at least one of the harmonics as mentioned before, for the purpose of operating a machine wound as would correspond generally a customary few pole machine, at a speed which would require a customary winding producing a greater number of poles.

Figure 1:
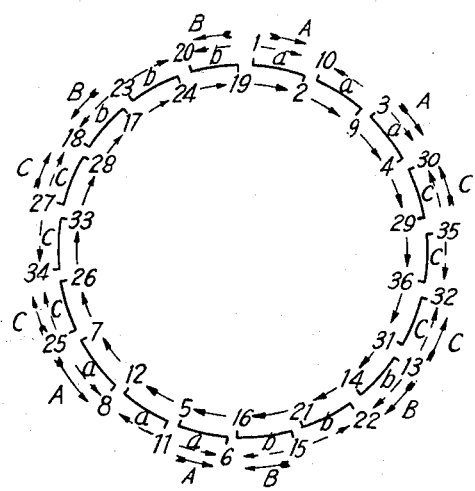
FIG. 1 shows a winding sub-divided into eighteen equal portions to allow two pole or ten pole operation when supplied with three-phase current.

FIG. 1 of the accompanying drawings shows a winding for alternative two or ten pole operation. Each arc having each end denoted by a number represents a sub-group winding portion of a normal 60° main winding group, that is a group of coil-sides connected in series. Each of the main groups comprises three sections, so connected that there is opposition between the centre and outer section sub-groups of each main group, thereby to fulfil the condition stated before, that is to suppress the fundamental and accentuate the fifth harmonic for ten pole operation. The dashed line arrows and small letters *a*, *b*, *c*, indicate the direction of current flow and phase for the ten pole operation, the full line arrows with tails and capitals indicate the current flow and phase when the sub-groups are connected for two pole operation. The full line arrows without tails and capitals indicate the current flow for 2:5 speed change and will be referred to later. It will be noted that the centre sub-groups are not connected for two pole operation in order to reduce the number of terminals. However, if desired, these sub-groups may be connected for two pole operation and then the flow in the centre sub-group would be the same as in the outer groups to result in the pattern +++ for each complete group.

2:5 Speed Change

Figure 2:
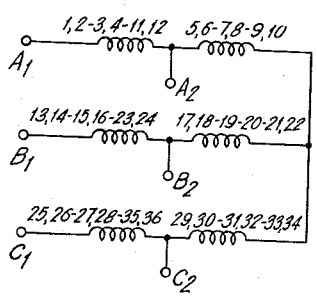
FIG. 2 is a connection pattern showing how an arrangement according to FIG. 1 can be operated with a four pole harmonic field instead of the fundamental two pole field so that with alternative ten pole and four pole operations the speed change is as 2:5.

Considering the flow of current in the winding portions of FIG. 1 as indicated by the full line arrows without tails, a speed relationship of 2:5 is possible by providing four pole operation instead of two pole operation at the higher speed. FIG. 2 shows a preferred connection diagram to achieve this. Two groups of external terminals A1, B1, C1; A2, B2, C2; only are necessary an internal star point being formed at the right hand end of the diagram. For four pole operation terminals A2, B2, C2 are connected to a three-phase source, while terminals A1, B1, C1 are connected together to form a star point. For ten pole operation A1, B1, C1 are connected to the supply source while A2, B2, C2 are left unconnected to provide a parallel star-series star arrangement. It will be obvious to the expert that alternatively a delta-parallel star arrangement could be provided with six terminals.

The three winding portions into which a phase band or group is split need not be equal but the mid-portion must be reversed in relation to the outer portion and the proportionality which affords best results depends upon the individual machine. If the winding of a main group are accommodated in four slots sub-groups can be connected in the +, —, —, + sense so that an inner section of sub-groups opposes the two outer sections. Also while the arrangement has been described with reference to four poles, a machine having any desired pole number can be designed when the winding pattern is repeated as mentioned for the 2:5 speed ratio.

An auxiliary winding which is electrically displaced with respect to the main winding can be provided with a view to reducing undesirable harmonic content.

While in the example shown the fundamental M.M.F. comprises two poles, it will be appreciated that a motor having any even number of fundamental poles can be designed by repeating the winding pattern, shown for the two pole arrangement.

Variations are possible without departing from this invention. Other "internal" and "external" connections, which are equivalent to the embodiment shown, without departing from the invention.

Rotors suitable for operation with stator windings of machines according to this invention can be customary squirrel cage type, with single or double cages, depending upon the individual torque requirements as is well known. For the two-speed machines the accepted principles of determining the number of rotor slots are applied for the higher speed operation, with the qualification that the rotor slot number must not equal the number of poles, or pole pairs at lower speed operation.

The invention may be employed with advantage for driving sugar centrifuges, lifts and machine tools for instance.

What we claim is:

A speed change induction motor having a distributed polyphase stator winding with eighteen winding portions 1—2, 35—36 of equal angular span arranged in positional angular sequence as: 1—2, 10—9, 3—4, 30—29, 35—36, 32—31, 13—14, 22—21, 15—16, 6—5, 11—12, 8—7, 25—26, 34—33, 27—28, 18—17, 23—24, 20—19;

one terminal (A1) of a first three terminal group being connected to an internal star point over winding portions 1—2, 3—4, 11—12, 5—6, 7—8, 9—10;

a second terminal (B1) of the first group being connected to the internal star point over winding portions 13—14, 15—16, 23—24, 17—18, 19—20, 21—22;

and a third terminal (C1) of the said first terminal group being connected to the internal star point over winding portions 25—26, 27—28, 35—36, 29—30, 31—32, 33—34;

a terminal (A2) of a second three terminal group being connected to the portion ends 5 and 11;

a second terminal (B2) of the second three terminal group being connected to the portion ends 17 and 23;

and a third terminal (C2) of the said second three terminal group being connected to the portion ends 29 and 35;

the terminals of the second group (A2, B2, C2) being connectible to a three-phase source, while the terminals of the first group (A1, B1, C1) are connected together to form a second star point, for four pole operation with parallel star arrangement;

and the terminals of the first group (A1, B1, C1) being connectible to a three-phase supply source, while the terminals of the second group (A2, B2, C2) are left unconnected for ten pole operation with series star arrangement.

References Cited in the file of this patent

UNITED STATES PATENTS

| | | |
|---|---|---|
| 2,850,690 | Rawcliffe | Sept. 2, 1958 |
| 2,898,535 | Rawcliffe | Aug. 4, 1959 |
| 2,959,721 | Buller et al. | Nov. 8, 1960 |